(12) United States Patent
Roycroft et al.

(10) Patent No.: US 6,773,315 B2
(45) Date of Patent: Aug. 10, 2004

(54) POWER TRAIN

(75) Inventors: Terence James Roycroft, Waiuku (NZ); Alan Timothy Gibbs, London (GB)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/343,601

(22) PCT Filed: Aug. 23, 2001

(86) PCT No.: PCT/GB01/03770
§ 371 (c)(1),
(2), (4) Date: Apr. 15, 2003

(87) PCT Pub. No.: WO02/16157
PCT Pub. Date: Feb. 28, 2002

(65) Prior Publication Data
US 2004/0023569 A1 Feb. 5, 2004

(51) Int. Cl.⁷ .................................................. B60F 3/00
(52) U.S. Cl. ..................................... 440/12.51; 440/75
(58) Field of Search .......................... 440/12.5, 12.51, 440/75

(56) References Cited

U.S. PATENT DOCUMENTS

| | | | |
|---|---|---|---|
| 3,583,243 A | 6/1971 | Wilson | |
| 4,558,668 A | 12/1985 | Yabunaka | 123/195 |
| 4,595,371 A | * 6/1986 | Heston | 440/75 |

FOREIGN PATENT DOCUMENTS

| | | |
|---|---|---|
| DE | 3916200 | 11/1990 |
| JP | 58128926 | 8/1983 |
| JP | 63093607 | 4/1988 |

OTHER PUBLICATIONS

Copy of International Search Report dated Jun. 12, 2001.
Copy of United Kingdom Search Report dated Jul. 12, 2001.

* cited by examiner

Primary Examiner—Stephen Avila
(74) Attorney, Agent, or Firm—Young & Basile, P.C.

(57) ABSTRACT

An amphibious vehicle power train has an engine with crankshaft and solid or fluid flywheel; a transmission arranged in line with the crankshaft, with an input shaft driven from the flywheel; and a power take off for driving shafts and marine propulsion means. The power take off has a driving sprocket attached to the crankshaft, a chain or belt, and a driven sprocket. Bevel gears are provided to convert transverse engine crankshaft rotation to longitudinal marine drive.

19 Claims, 4 Drawing Sheets

POWER TRAIN

The present invention relates to a power train for an amphibious vehicle, which power train comprises an engine and in-line transmission, with a power take off positoned between the engine and the in-line transmission of the vehicle and commonly known as a sandwich power take off. The invention also relates to an amphibious vehicle comprising such a power train.

In a conventional vehicle power train having an engine and an in-line transmission, an input or primary shaft of the transmission is driven from the flywheel by means of a clutch. Alternatively, where the transmission comprises an automatic gearbox, the input shaft may be driven from a fluid flywheel, known as a torque converter. In known sandwich power take off arrangements, the input shaft of the transmission is extended and a drive means in the form of a sprocket is mounted between the clutch or fluid flywheel and the casing of the transmission. The sprocket drives a power take off by means of a belt or chain.

This known arrangement significantly increases the length of the engine and transmission assembly, and requires fewer sets of bearings to support the input shaft extension in the front of the gearbox, where space is restricted. It is also necessary to cut away the bell housing or gearbox casing to make room for the chain or belt.

It is an object of the invention to provide a power train having a sandwich power take off which can be manufactured with less machining operations and which is more adaptable to various power train layouts than prior art sandwich power take offs.

According to a first aspect of the present invention there is provided a power train for an amphibious vehicle, the power train comprising an engine having a crankshaft and a solid or fluid flywheel, and a transmission arranged generally in-line with the crankshaft of the engine, the transmission having an input shaft driven from the flywheel the power train further comprising a power take off for driving a power take off shaft adapted to drive a marine propulsion means of the vehicle, characterised in that the power take off comprises drive means attached to the flywheel end of the crankshaft, the drive means being adapted to drive the power take off shaft.

In one preferred embodiment, the drive means is provided on a peripheral surface of the flywheel. In this arrangement, the drive means may comprise a set of teeth provided on an outer periphery of the flywheel, the teeth driving the power take off shaft through a chain or toothed belt.

In a further preferred embodiment, the drive means is provided between the flywheel end of the crankshaft and the flywheel. In this arrangement, the drive means may comprise a sprocket which drives the power take off shaft through a chain or toothed belt. The sprocket may be mounted to the end of the crankshaft between the end and the flywheel, and may be held in position by means of fasteners which also attach the flywheel to the crankshaft end. Alternatively, the drive means may comprise a bevel gear mounted on the flywheel end of the crankshaft. The bevel gear mounted on the flywheel end of the crankshaft meshes with a second bevel gear which can be mounted for rotation with the power take off shaft itself or with an intermediate shaft which is adapted to drive the power take off shaft. The intermediate shaft may be adapted to drive the power take off shaft through a constant velocity (CV) or other rotating articulating joint. Alternatively, the intermediate shaft carries a third bevel gear which meshes with a fourth bevel gear mounted for rotation with the power take off shaft.

Where drive is transmitted from the drive means to the power take off shaft via a chain or toothed belt, the chain or toothed belt may be adapted to drive a driven sprocket for driving the power take off shaft. The driven sprocket may be mounted for rotation with the power take off shaft, or, where the engine and transmission are adapted to be mounted transversely to the longitudinal axis of the vehicle, the driven sprocket may be mounted for rotation with an intermediate shaft which is adapted to drive the power take off shaft through a pair of bevel gears.

An intermediate casing may be provided between a bell housing of the transmission and a casing of the engine. The intermediate casing may have an extension which houses the driven sprocket, gears, or CV joint; and the chain, toothed belt, or power take off shaft(s).

Alternatively, a bell housing of the transmission may be adapted to house the driven sprocket and the chain or toothed belt.

A decoupler may be provided in the drive to the marine propulsion unit.

It is a particular advantage of the power train according to the invention, that it is possible to provide full engine power to the marine propulsion means, with a minimum of frictional losses.

According to a second aspect of the invention, there is provided an amphibious vehicle having a power train in accordance with the first aspect of the invention.

The invention will now be described by way of example only with reference to the accompanying drawings in which.

Figure 1:
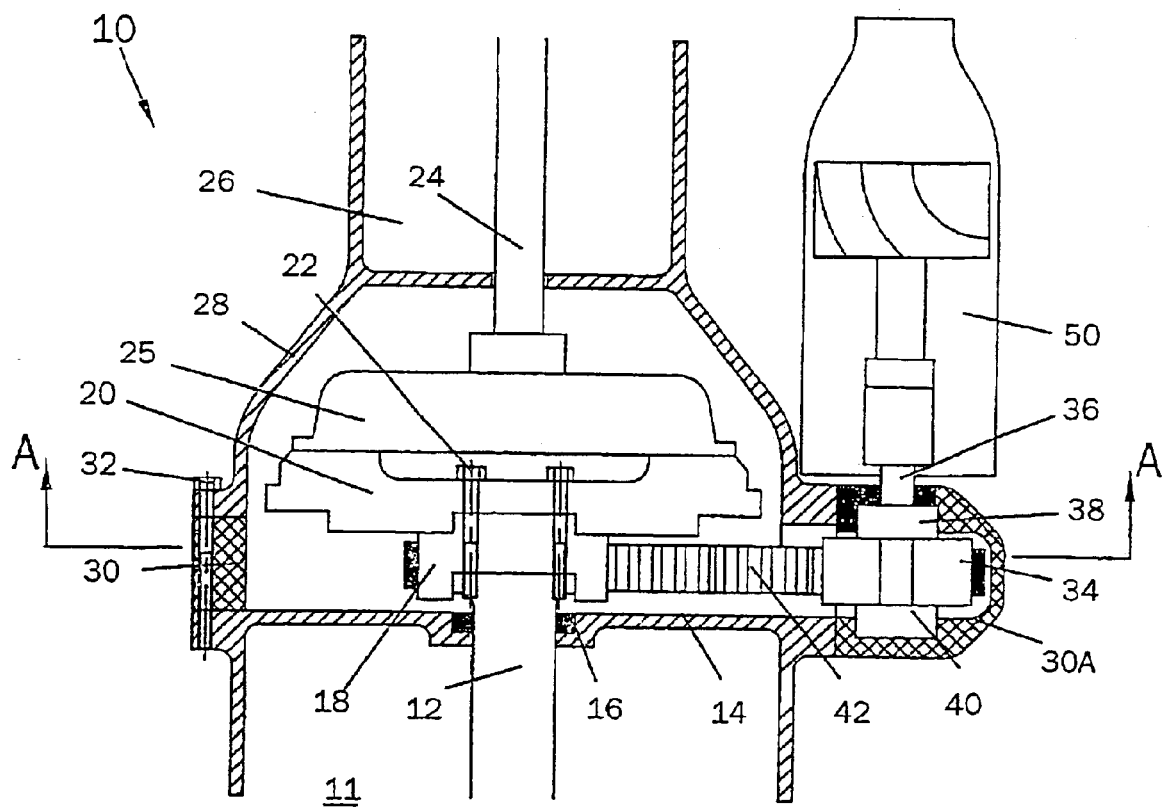
FIG. 1 is a sectional view of part of a power train in accordance with a first embodiment of the invention.
Figure 2:
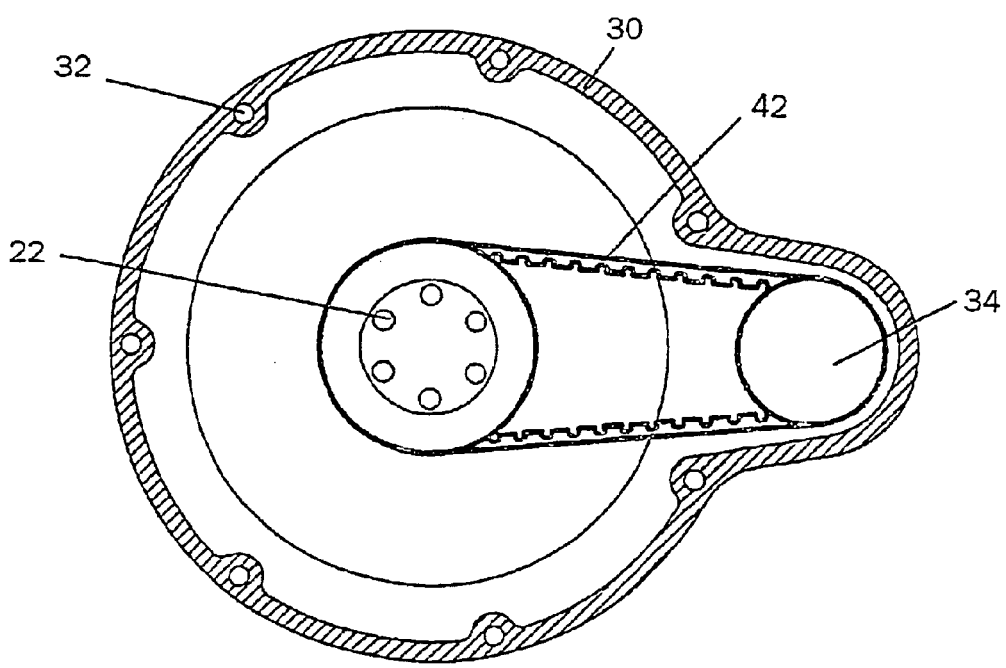
FIG. 2 is a sectional view taken on line A—A of FIG. 1.

Referring firstly to FIGS. 1 & 2, a first embodiment of a power train in accordance with the invention comprises an engine 11 and a transmission 26 arranged in-line with the crankshaft 12 of the engine. The engine and transmission provide drive to at least the rear road wheels (not shown) of an amphibious vehicle (not shown) via a differential (not shown) in a conventional manner. Drive for a marine propulsion means of the vehicle, such as water jet 50, is provided by a power take off indicated generally at 10.

The crankshaft 12 of the engine extends through an aperture in the end of an engine casing 14. Seals 16 are provided in the aperture to seal between the crankshaft 12 and the engine casing 14. A driving sprocket 18 and a flywheel 20 are mounted on the end of the crankshaft 12, outside the engine casing 14, and are rigidly attached to the crankshaft 12 by means of a circle of bolts 22. The sprocket 18 is held between the end of the crankshaft 12 and the flywheel 20. A clutch 25 mounted in conventional manner to the face of the flywheel 20 transfers drive to an input or primary shaft 24 of the transmission 26.

The bell housing 28 of the transmission 26, which in a conventional arrangement would be bolted directly to the end of the engine casing 14, is spaced from the engine casing by an intermediate casing 30. Bolts 32 pass through the bell housing 28 and the intermediate casing 30 and engage in the usual threaded holes provided in the engine casing 14.

The intermediate casing 30 has an extension 30A to one side of the engine casing 14. The extension 30A houses a driven sprocket 34 which is mounted to a power take off shaft 36. The power take off shaft 36 and the driven sprocket 34 being rotatably supported in the extension 30A by bearings 38,40. The driving sprocket 18 and the driven sprocket 34 are interconnected by means of a chain or toothed belt 42 in order to transmit drive between the two.

The power take off shaft 36 is adapted to drive the water jet 50 to provide propulsion for the amphibious vehicle when on water. The power take off shaft 36 may drive the water jet directly or it may have a coupling (not shown) to which a further shaft for driving the water jet can be attached. A decoupler may be provided in the drive line between the power take off shaft 36 and the water jet, such that drive to the water jet can be decoupled when the vehicle is being used on land.

In the present embodiment, the transmission 26 is a manual change gearbox, however, it should be understood that the transmission 26 could comprise an automated manual gearbox, an automatic or semi-automatic gearbox, or a continuously variable transmission and that the friction clutch 25 could be replaced with a fluid coupling, such as a torque converter, as appropriate.

Figure 3:
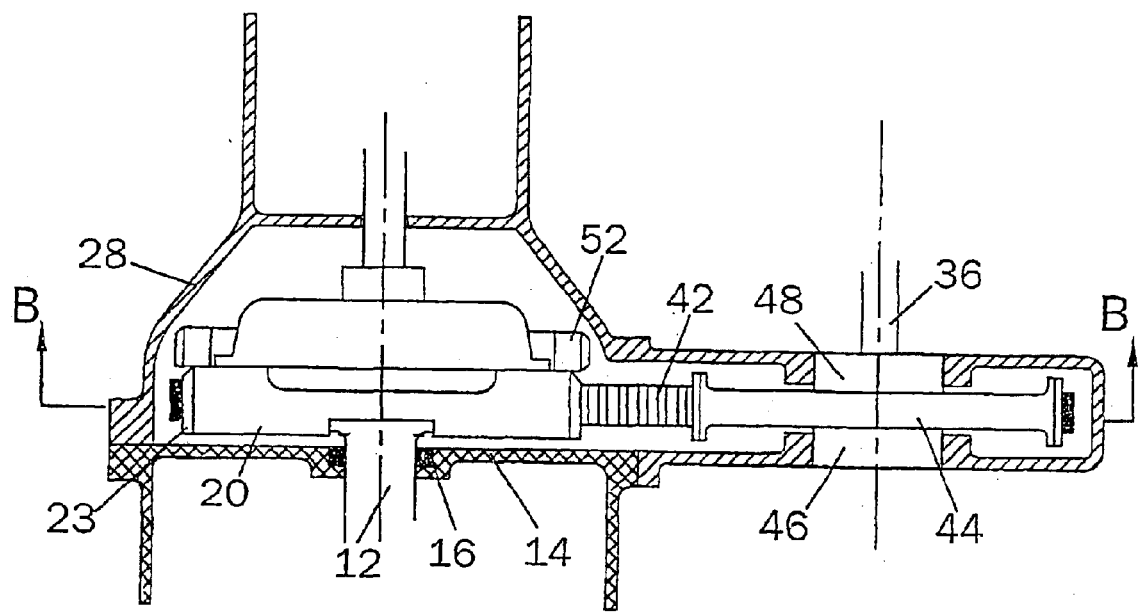
FIG. 3 is a sectional view of part of a power train in accordance with a second embodiment of the invention.
Figure 4:
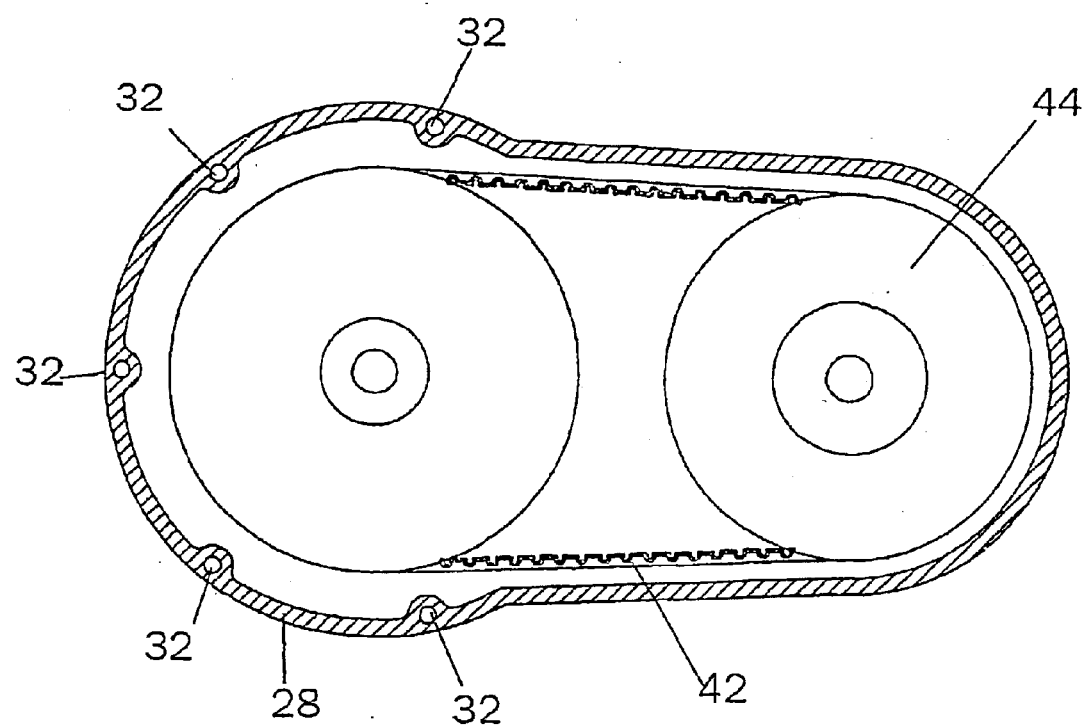
FIG. 4 is a sectional view taken on line B—B of FIG. 3.

A second embodiment of the invention will now be described with reference to FIGS. 3 and 4. Common reference numerals have been used to identify parts in common with the parts in the first embodiment.

The power train of the second embodiment is similar to that of the first embodiment except that rather than providing a drive means for the power take off as a sprocket between the end of the crankshaft and the flywheel, the drive means in this embodiment comprises a set of teeth 23 arranged on a peripheral surface of the flywheel. The teeth 23 drive a driven sprocket 44 mounted to a power take off shaft 36 by means of a chain or toothed belt 42. The power take off shaft 36 drives a marine propulsion system (not shown) of the amphibious vehicle in a manner similar to that described in respect of the first embodiment.

Because there is no additional sprocket between the flywheel and the end of the crankshaft, there us no need to provide an intermediate casing between the bell housing 28 and the engine casing 14. Consequently, the bell housing 28 is adapted in order to accommodate the chain or belt 42 and driven sprocket 44. The driven sprocket 44 and the power take off shaft 36 being rotatably supported in the bell housing 28 by means of bearings 46, 48.

A ring gear 52 is provided on a face of the flywheel for engagement with a starter motor in a manner known in the art.

In the embodiments described above, the engine and transmission are adapted to be mounted to the vehicle in what is known as a North/South alignment, which means to say that the thing end of the engine faces the front of the vehicle whilst the transmission extends towards the rear. In these arrangements, the power take off shaft 36 faces the direction of the transmission in order to provide drive to the water jet 50 at the rear of the vehicle. It should be understood, however, that the engine and transmission could be adapted to be mounted in a South/North alignment, with the timing end of the engine facing the rear of the vehicle and the transmission extending toward the front. In this case, it will be necessary for the power take off shaft 36 to face in the opposite direction with respect to the engine and transmission, that is to face towards the engine in order to drive a water jet 50 at the rear of the vehicle.

The invention can also be applied to a power train in which the engine and transmission are adapted to be mounted transversely to the longitudinal direction of the vehicle axis. In order to do this, it will generally be necessary to transmit the power take off drive through 90 degrees in order to drive a water jet at the rear of the vehicle. This can be done in a number of ways, but a particularly simple and efficient manner is to drive the water jet through a pair of bevel gears. One example of such an arrangement is shown in FIG. 5, in which parts having a similar function to parts described with reference to FIGS. 1 to 4 are given the same reference numerals but increased by 100.

Figure 5:
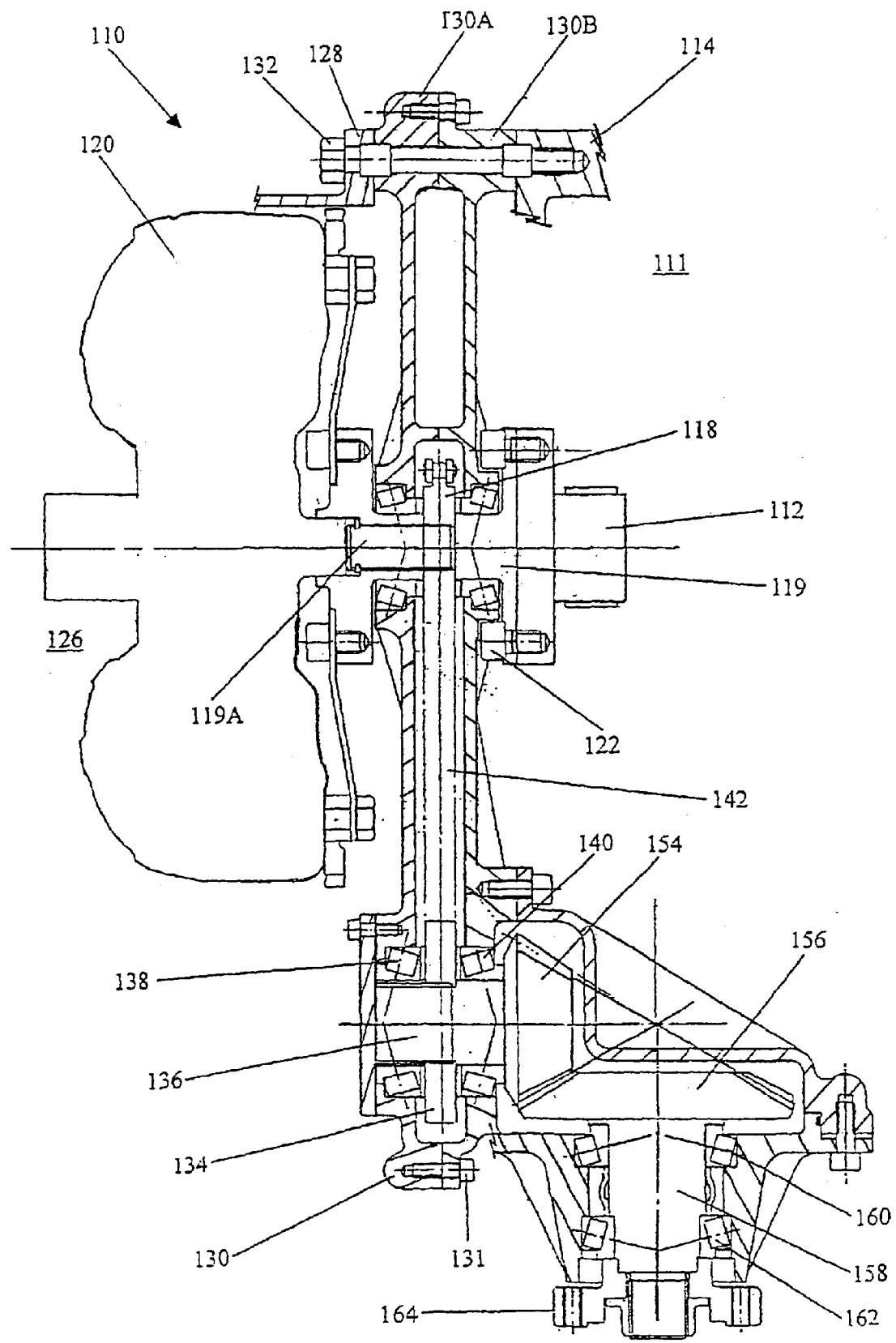
FIG. 5 is a sectional view of part of a power train in accordance with a third embodiment of the invention.

FIG. 5 shows the flywheel end of a crankshaft 112 of a transverse engine 111. Attached to the crankshaft are a driving sprocket 118 for the power take off and a flywheel 120. In this embodiment, the flywheel is in the form of a torque converter which, although not shown in FIG. 5, drives an input shaft of an automatic transmission 126.

The driving sprocket 118 and the flywheel 120 are attached to the flywheel end of the crankshaft by means of an adaptor 119 which is fastened to the crankshaft 112 by a set of bolts 122. The adaptor has a splined shaft 119A on which the flywheel 120 and the driving sprocket 118 are mounted for rotation with the crankshaft.

An intermediate casing 130 is provided between a bell housing 128 of the transmission and a casing 114 of the engine. In this embodiment, the intermediate casing is formed in two parts 130A, 130B which are joined together by a series of bolts 131. The intermediate casing and the transmission are attached to the engine casing by means of a further series of bolts 132. The intermediate casing 130 houses a driven sprocket 134 which is mounted on an intermediate shaft 136. The intermediate shaft 136 and the driven sprocket 134 are rotatably supported in the intermediate casing by a pair of bearings 138, 140. The driving sprocket 118 and the driven sprocket 134 are interconnected by means of a chain or toothed belt 142 in order to transit drive between the two.

A first bevel gear 154 is mounted for rotation with the intermediate shaft 136 and is arranged to mesh with a second bevel gear 156. The second bevel gear is mounted for rotation with a power take off shaft 158 having an axis which is aligned generally at 90 degrees to the axis of the intermediate shaft 136. The power take off shaft 158 is rotatably supported in an extension of the intermediate casing 130 by bearings 160, 162 and carries a coupling 164 which can be attached to a further drive shaft for driving a water jet at the rear of the vehicle.

Figure 7:
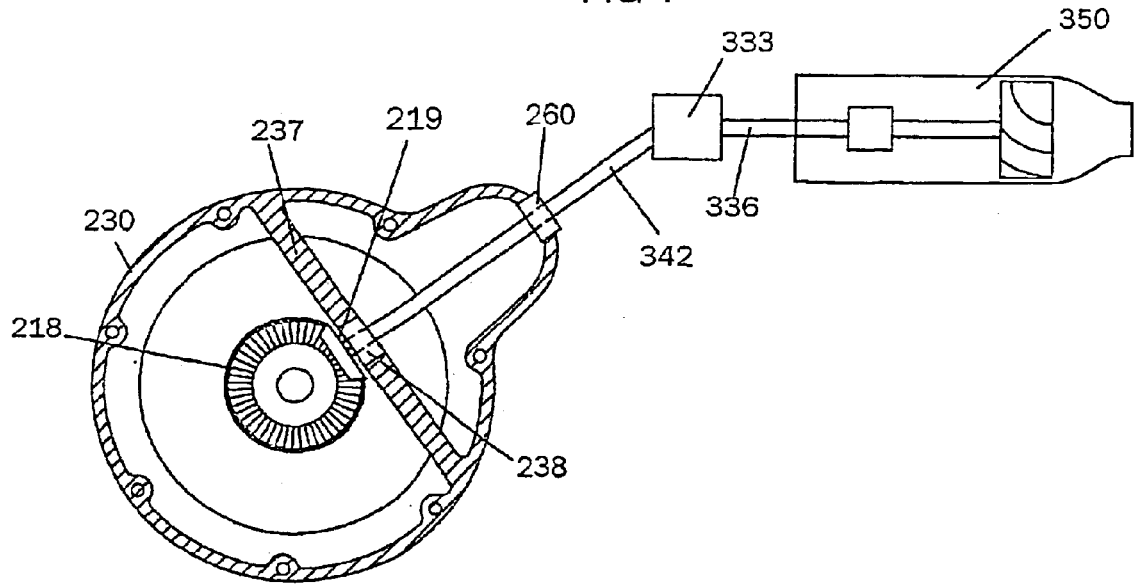
FIG. 7 is a sectional view of part of a power train in accordance with a fifth embodiment of the invention.
Figure 8:
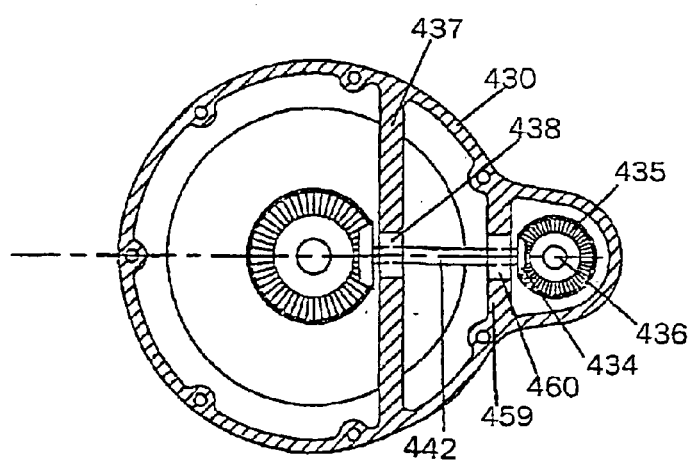
FIG. 8 is a sectional view of part of a power train in accordance with a sixth embodiment of the invention.

In each of the above embodiments, the drive means has teeth for engagement with a chain or toothed belt in order to transmit drive to the power take off shaft. However, the drive means could be in the form of a gear which transmits drive to the power take off shaft via one or more further gears. For example, FIGS. 6 to 8 show embodiments of the invention in which a bevel gear 218 is mounted to the flywheel end of the crankshaft In each of the embodiments shown, the bevel gear 218 and the flywheel are attached to the crankshaft by means of an adaptor similar to adaptor 119 in the embodiment shown in FIG. 5.

Figure 6:
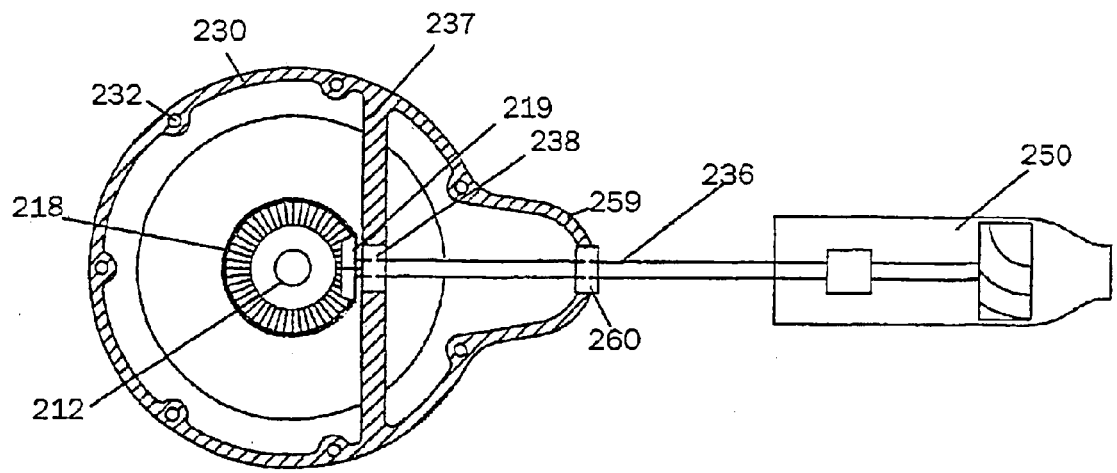
FIG. 6 is a sectional view of part of a power train in accordance with a fourth embodiment of the invention.

In the embodiment shown in FIG. 6, the bevel gear 218 meshes with a second bevel gear 219 mounted for rotation with a power take off shaft 236 which directly drives the marine propulsion unit 250 at the rear of the vehicle. The power take off shaft 236 runs in bearings 238 and 260, which are mounted in supports 237 and 259, attached to intermediate housing 230.

The embodiment shown in FIG. 6 is particularly suited to a transverse engine installation, where the centre line of the marine propulsion unit 250 is level with the crankshaft axis. However, if the marine propulsion unit is positioned above or below the crankshaft axis, it will be necessary to adjust the height of the output shaft 236. There are a number of ways in which this can be achieved as will be clear to those skilled in the art. For example, the height of the output shaft could be adjusted by means of an additional chain, belt, or gear drive. However, a preferred arrangement for effecting the change in height is shown in FIG. 7.

In this fifth embodiment, the intermediate housing 230 is rotated to provide a power take off at a higher level. An intermediate shaft 342, supported in the housing 230 by inner and outer bearings 238, 260, has a bevel gear 219 which meshes with the bevel gear 218 on the crankshaft. The intermediate shaft 342 is connected to a power take off shaft 336 by means of a constant velocity (CV) joint 333 which drives the power take off shaft 336 at the required angle, according to the installation of marine propulsion unit 350. Whilst a CV joint is the preferred form of rotating articulating joint, any suitable type of rotating articulating joint could be used.

A final embodiment of power take off having a drive means in the form of a bevel gear is shown in FIG. 8. This embodiment is particularly suited to a longitudinal or in-line engine installation. The bevel gear 218 on the crankshaft meshes with a second bevel gear 219 on a first end of an intermediate shaft 442. A third bevel gear 434 is mounted to the other end of the intermediate shaft and meshes with a fourth bevel gear 435 which is mounted on a power take off shaft 436. The intermediate shaft 442 is rotatably supported in supports 437, 459 in housing 430 by means of inner and outer bearings 438, 460.

By attaching a drive means for driving a power take off shaft to the flywheel end of the crankshaft in accordance with the invention, it is possible to provide a power train having a sandwich power take off in which the overall length of the engine and transmission is kept to a minimum. This is an important consideration in the design of an amphibious vehicle in which the space for mounting the engine and transmission can be severely limited. The arrangement also ensures that the power take off is driven directly from the engine crankshaft rather than through the clutch or fluid flywheel. This means that the fall engine power can be provided to the power take off with minimum losses. The arrangement is also simpler than prior art arrangements which reduces manufacturing costs and improves reliability.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, the marine propulsion means need not be a water jet but could be any suitable type such as a marine screw propeller.

What is claimed is:

1. A power train for an amphibious vehicle, the power train comprising an engine having a crankshaft and a solid or fluid flywheel, and a transmission arranged generally in-line with the crankshaft of the engine, the transmission having an input shaft driven from the flywheel, the power train further comprising a power take off for driving a power take off shaft adapted to drive a marine propulsion means of the vehicle, characterised in that the power take off comprises drive means attached to the flywheel end of the crankshaft, the drive means being adapted to drive the power take off shaft.

2. A power train as claimed in claim 1, wherein the drive means is provided on a peripheral surface of the flywheel.

3. A power train as claimed in claim 2, wherein the drive means comprises a set of teeth provided on an outer periphery of the flywheel, the teeth driving the power take off shaft through a chain or toothed belt.

4. A power train as claimed in claim 1, wherein the drive means is provided between the flywheel end of the crankshaft and the flywheel.

5. A power train as claimed in claim 4, wherein the drive means comprises a sprocket which drives the power take off shaft through a chain or toothed belt.

6. A power train as claimed in claim 5, wherein the sprocket is mounted to the flywheel end of the crankshaft between said end and the flywheel.

7. A power train as claimed in claim 3, wherein the chain or toothed belt drives a driven sprocket for driving the power take off shaft.

8. A power train as claimed in claim 7, wherein the driven sprocket is mounted for rotation with the power take off shaft.

9. A power train as claimed in claim 7, wherein the engine and transmission are adapted to be mounted transversely to the longitudinal axis of the vehicle, the driven sprocket being mounted for rotation with an intermediate shaft which is adapted to drive the power take off shaft through a pair of bevel gears.

10. A power train as claimed in claim 1 wherein the drive means comprises a bevel gear mounted on the flywheel end of the crankshaft.

11. A power train as claimed in claim 10, wherein the bevel gear mounted on the flywheel end of the crankshaft meshes with a second bevel gear mounted for rotation with the power take off shaft.

12. A power train as claimed in claim 10, wherein the bevel gear mounted on the flywheel end of the crankshaft meshes with a second bevel gear mounted for rotation with an intermediate shaft, the intermediate shaft being adapted to drive the power take off shaft.

13. A power train as claimed in claim 12, wherein the intermediate shaft is adapted to drive the power take off shaft through a CV or other rotating articulating joint.

14. A power train as claimed in claim 12, wherein the intermediate shaft carries a third bevel gear which meshes with a fourth bevel gear mounted for rotation with the power take off shaft.

15. A power train as claimed in claim 4, wherein an intermediate casing is provided between a bell housing of the transmission and a casing of the engine.

16. A power train as claimed in claim 15 wherein the chain or toothed belt drives a driven sprocket for driving the power take off shaft and the intermediate casing has an extension which houses the driven sprocket and the chain or toothed belt.

17. A power train as claimed in claim 15 wherein the drive means includes a bevel gear mounted on the flywheel end of the crankshaft and the intermediate casing has an extension which houses part of at least one of the power take off shaft and the intermediate shaft.

18. A power train as claimed in claim 7 wherein a bell housing of the transmission is adapted to house the driven sprocket and the chain or toothed belt.

19. An amphibious vehicle, characterised in that it comprises a power train as claimed in claim 1.

* * * * *